(12) United States Patent
Srivastava et al.

(10) Patent No.: US 7,509,519 B2
(45) Date of Patent: Mar. 24, 2009

(54) RECOVERY AND DEBUGGING OF FAILED NETWORK-ACCESSIBLE SERVICE CONSTRUCTION

(75) Inventors: Biplav Srivastava, Noida (IN); Arun Kumar, New Delhi (IN); Koustuv Dasgupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 11/289,152

(22) Filed: Nov. 29, 2005

(65) Prior Publication Data

US 2007/0168691 A1 Jul. 19, 2007

(51) Int. Cl.
G06F 11/00 (2006.01)
(52) U.S. Cl. .............................. 714/4; 714/26; 714/46; 714/57
(58) Field of Classification Search .................... 714/4, 714/26, 46, 57
See application file for complete search history.

(56) References Cited

U.S. PATENT DOCUMENTS

| | | | |
|---|---|---|---|
| 6,226,273 B1 | 5/2001 | Busuioc et al. | |
| 6,615,166 B1 | 9/2003 | Guheen et al. | |
| 7,155,720 B2 * | 12/2006 | Casati et al. | 718/104 |
| 7,363,628 B2 * | 4/2008 | Shukla et al. | 719/313 |
| 2004/0162741 A1 | 8/2004 | Flaxer et al. | |

OTHER PUBLICATIONS

U.S. Appl. No. 10/727,672, filed Dec. 4, 2003, "Constructing Network-Accessible Services".

Nanda, M. G. and Karnik, N. "Synchronization Analysis for Decentralized Composite Web Services", *Proceedings of the Association of Computing Machinery International Symposium on Applied Computing*, Melbourne (Florida), Mar. 2003.

M. Zulkernine et al., Towards automatic monitoring of component-based software systems, Journal of Systems and Software 74 (2005) 15-24.

F. Tartanoglu et al., "Coordinated forward error recovery for composite web services", Proceedings of the 22$^{nd}$ IEEE Symposium on Reliable Distributed Services, Italy, Oct. 2003.

S. Anderson et al., "Dependable Grid Services," Proceedings of UK e-Science All Hands Meeting 2003, Aug. 18, 2003.

(Continued)

*Primary Examiner*—Robert Beausoilel
*Assistant Examiner*—Charles Ehne
(74) *Attorney, Agent, or Firm*—Gibb Intellectual Property Law Firm, LLC

(57) ABSTRACT

In response to determining that computer generation of an abstract workflow plan for a network-accessible service resulted in failure, a method attempts to automatically recover from the failure. Where attempting to automatically recover from this failure is unsuccessful, the method applies remedy rules, to assist in debugging the failure. In response to determining that computer assignment of a physical plan for the abstract workflow plan resulted in failure, the method attempts to automatically recover from the failure. Where attempting to automatically recover from this failure is unsuccessful, the method applies remedy rules, to assist in debugging the failure. In response to determining that computer evaluation of a runtime configuration for the physical plan resulted in a failure, the method attempts to automatically recover from the failure. Where attempting to automatically recover from this failure is unsuccessful, the method applies remedy rules, to assist in debugging the failure.

20 Claims, 6 Drawing Sheets

OTHER PUBLICATIONS

White Paper: Fault Management—how does fault management work, GoAhead Software, www.goahead.com, copyright 1999-2000.

Srinvastava, B. in "Automatic Web Services Composition Using Planning", *Proceedings of Knowledge Based Computer System* (KBCS), pp. 467 to 477, Mumbai, 2002, ISBN 81-259-1428-5.

M. Shin, "Software Architecture for Self-Healing of Concurrent and Distributed Components," Proceedings of the Int'l Conference on Software Engineering Research and Practice, SERP'04, Jun. 21-24, 2004, Las Vegas, NV, vol. 1, previously presented. 97-103, ISBN 1-932415-28-9.

* cited by examiner

ADDRESS

ADDRESS BOOK SERVICE
310

NAME

DIRECTION

DIRECTION SERVICE
320

ADDRESS 1,

ADDRESS 2

DIRECTION

GPS DIRECTION SERVICE
330

NAME 1,

NAME 2

FIG 4
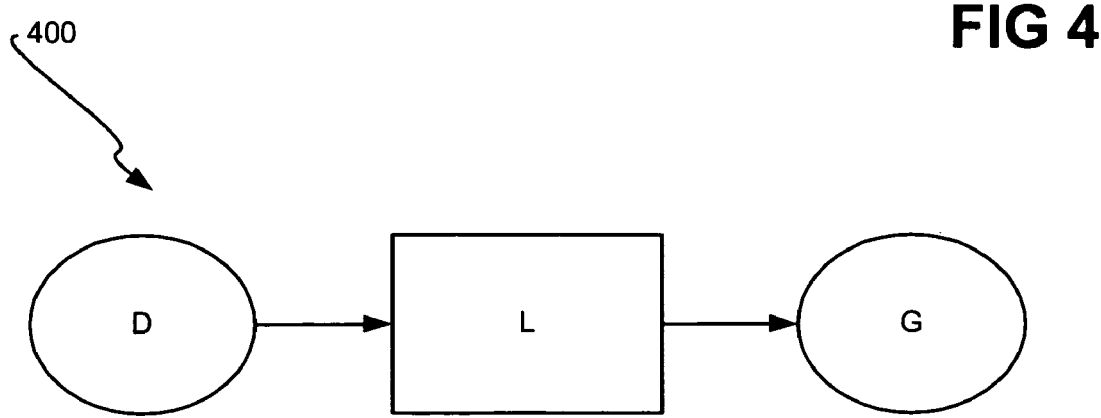
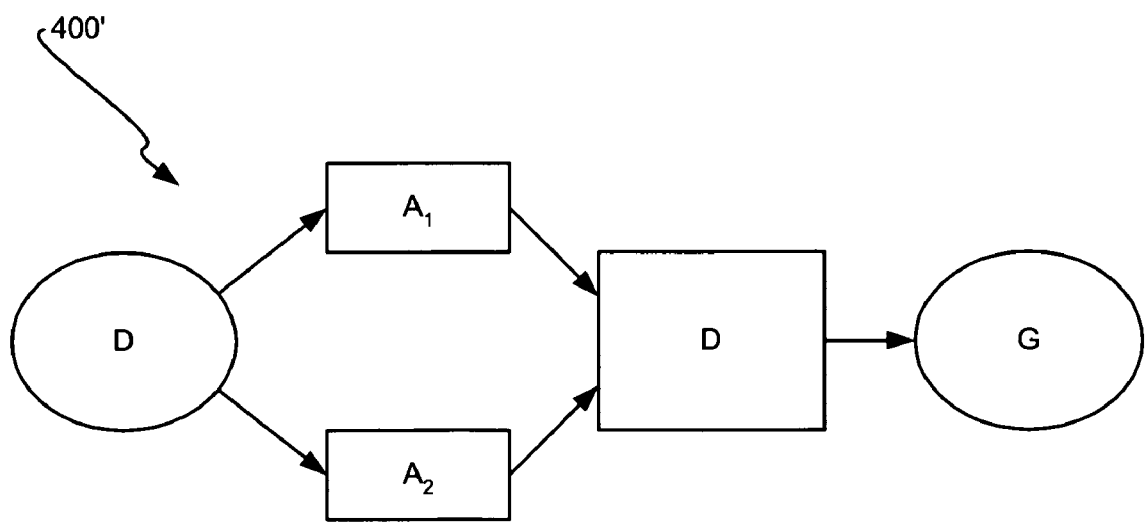

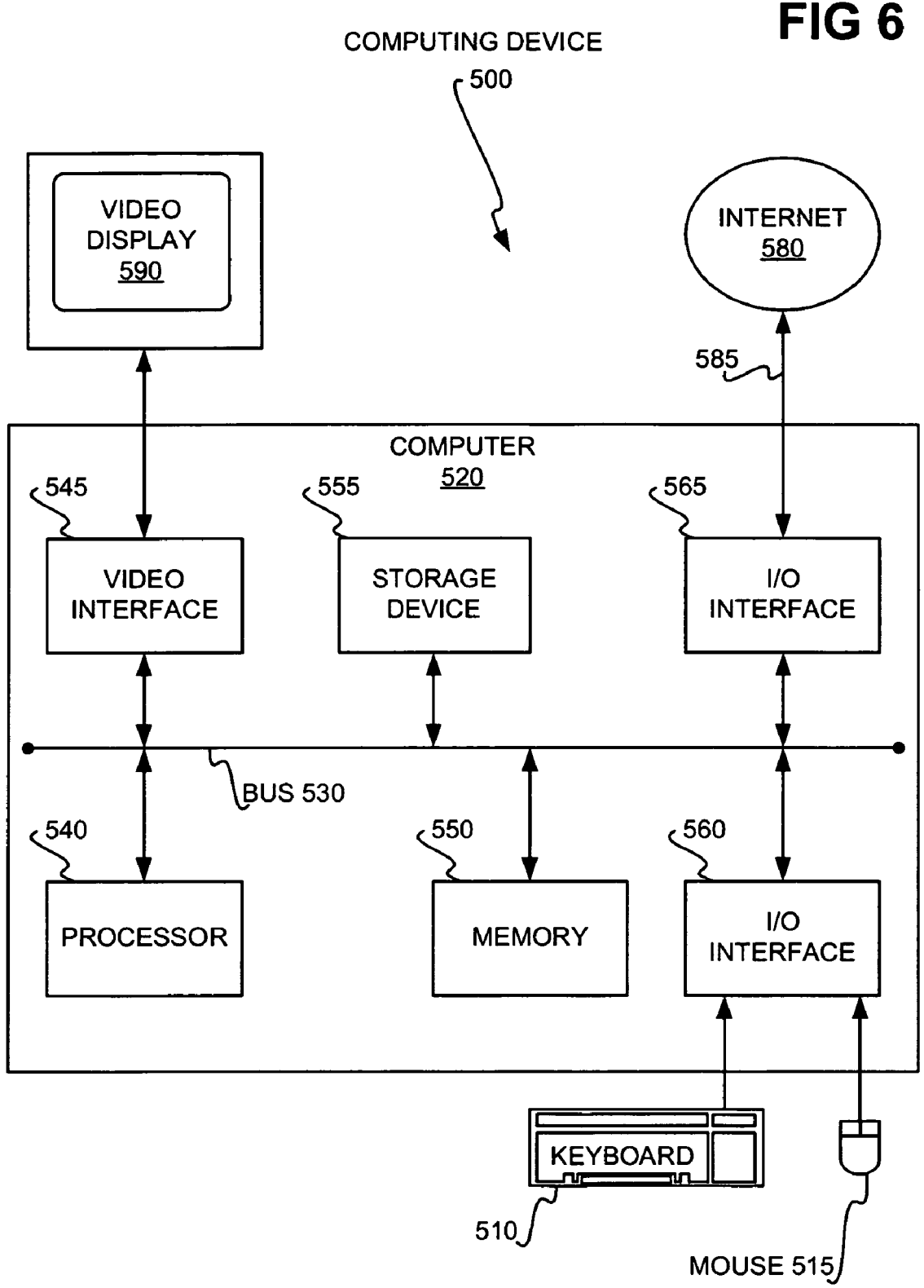

RECOVERY AND DEBUGGING OF FAILED NETWORK-ACCESSIBLE SERVICE CONSTRUCTION

FIELD OF THE INVENTION

The present invention relates generally to the construction of network-accessible services, and more particularly to recovery and debugging of failed such construction of network-accessible services.

BACKGROUND OF THE INVENTION

Composite network-accessible services, such as World-Wide Web (hereinafter, "web") services, can be constructed using reusable software components. Such components can be discovered and invoked by distributed applications to delegate their sub-functionality. The specification of a web service is published to a directory, and is made available for online access by deploying the service on an application server. Applications search for web services of interested from the web services directory, and invoke appropriate candidates using the published access information.

One way to construct network-accessible services is described in the previously filed patent application entitled "Constructing Network-Accessible Services," filed on Dec. 4, 2003, and assigned Ser. No. 10/727,672, which is hereby incorporated by reference. This patent application describes the construction of a composite service as a two-stage process. In the first stage, an abstract plan, or workflow, is generated by a plan selector for assembling the composite service definition. The web service instances can be grouped into web service types by common capabilities, and described formally. The plan selector implements an artificial intelligence (AI) planning algorithm, and constructs a plan by intelligently searching the possible combinations of web service capabilities. The output of the first stage is an abstract workflow plan, which is structurally complete and identifies the web service types to be invoked, but does not specify component instances. In the second stage of this process, the plan is instantiated into an executable physical plan, a runtime configuration of which is then evaluated.

A shortcoming of this two-stage process to network-accessible service construction is that any failure of the process causes the network-accessible service to not be constructed, without any feedback as to why the process has failed. That is, the person desiring to create a given network-accessible service is not provided with any information as to how to remedy the failure, and at best can only conjecture as to why the process has failed. For this and other reasons, therefore, there is a need for the present invention.

SUMMARY OF THE INVENTION

The present invention relates to recovery from failed network-accessible service construction. It provides for a basic set of recovery rules which can be generalized and augmented with further learning over time. A rule is automatically executed if its resolution action is unambiguous and does not require human intervention. Examples of such automatable rules are referenced below, in the detailed description, as the rules P-4, P-7, and P-9. A rule is not automatically executed, and instead requires human interaction (i.e., developer participation) for recovery, and can assist in debugging. The former rules are referred to herein as auto-recovery rules, whereas the latter rules are referred herein to as failure remedial, or remedy, rules.

A method of the invention, in response to determining that computer generation of an abstract workflow plan for a network-accessible service resulted in failure, attempts to automatically recover from the failure without human intervention. Where attempting to automatically recover from this failure is unsuccessful, the method applies plan selection failure remedy rules, with human intervention, to assist in debugging the failure. Failure to automatically recover may have occurred to the non-availability of recovery rules, for instance.

Furthermore, in response to determining that computer assignment of a physical plan for the abstract workflow plan resulted in failure, the method attempts to automatically recover from the failure without human intervention. Where attempting to automatically recover from this failure is unsuccessful, the method applies plan assignment failure remedy rules, with human intervention, to assist in debugging the failure.

Finally, in response to determining that computer evaluation of a runtime configuration for the physical plan resulted in a failure, the method attempts to automatically recover from the failure without human intervention. Where attempting to automatically recover from this failure is unsuccessful, the method applies runtime evaluation failure remedy rules, with human intervention, to assist in debugging the failure.

It is noted that in embodiment, automatic recovery does not have to be attempted. For instance, the developer or other individual attempting to implement a desired network-accessible plan by having the method performed may desire that automatic recovery not be attempted. In such an embodiment, the failure remedy rules are applied manually (i.e., with human intervention) upon detection of a failure in generating an abstract workflow plan, in assigning a physical plan, or in evaluating a runtime configuration of the physical plan.

A system of the invention includes a network-accessible-service generation mechanism, and a failure recovery-and-remedy mechanism. The former mechanism (composition) is to generate an abstract workflow plan for a network-accessible service, assign a physical plan for the abstract workflow plan, and evaluate a runtime configuration for the physical plan, all without human intervention. The latter mechanism (recovery-and-remedy) is to attempt to recover from failures in generating the abstract workflow plan, in assigning the physical plan, and in evaluating the runtime configuration for the physical plan. The rules that were designated by the developer to be automatically employed help in recovery without human intervention. The remainder of the rules aid the developer to debug the failure manually.

An article of manufacture of the invention includes a computer-readable medium and means in the medium. The computer-readable medium may be a recordable data storage medium, a modulated carrier signal, or another type of computer-readable medium. The means is for, without human invention, attempting to automatically recover from a failure in generating an abstract workflow plan for a network-accessible service, from a failure in assigning a physical plan for the abstract workflow plan, and from a failure in evaluating a runtime configuration for the physical plan. The means is further for applying rules upon failure to automatically recover, to assist in debugging, with human intervention.

Embodiments of the invention thus provide for advantages over the prior art. Where the network-accessible service construction results in failure, the present invention first attempts to automatically recover from the failure, so that construction of the desired service can continue. The present invention applies rules to provide information as to why the network-accessible service could not be created. These rules may be pre-specified, and/or they may be computer-learned over time. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a diagram of a representative and example construction of the abstract workflow plan of a network-accessible service, according to an embodiment of the invention.

FIG. 4 is a diagram schematically representing possible choices of the physical plan for the abstract workflow plan of the network-accessible service of FIG. 3, according to an embodiment of the invention.

FIG. 6 is a diagram of a representative computing device, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
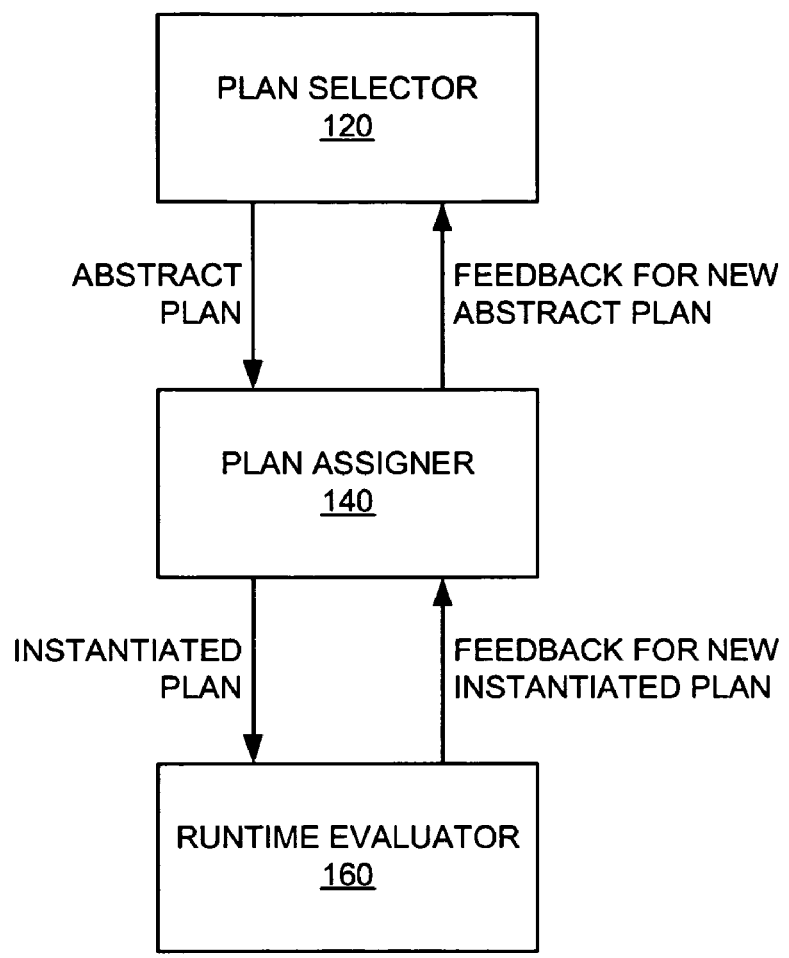
FIG. 1 is a diagram of a schematic representation of a system for constructing network-accessible services, according to an embodiment of the invention.

FIG. 1 shows a schematic representation of a system 100 for constructing network-accessible composite services, according to an embodiment of the invention. The system 100 is that which is more particularly described in the previously incorporated-by-reference patent application entitled "Constructing Network-Accessible Services." The system 100 includes a plan selector 120, a plan assigner 140, and a runtime evaluator 160. The plan selector 120 interacts with the plan assigner 140, which in turn interacts with the runtime evaluator 160. Each of these components may be implemented in hardware, software, or a combination of hardware and software.

The plan selector 120 generates an abstract workflow plan for a desired network-accessible service to be implemented. The abstract workflow plan identifies the types of web services that are needed to be used to generate the desired network-accessible service, and in what order. The plan assigner 140 in turn receives this abstract workflow plan, and assigns a physical plan for the abstract workflow plan. In particular, the plan assigner 140 assigns specific instances of web services to the abstract workflow plan. The runtime evaluator 160 then receives this physical or instantiated plan, and evaluates it to determine whether the physical plan violates any runtime constraints, such as response time, throughput, cost, availability, conflict of interest, and so on, which are typically defined in a Service Level Agreement (SLA) document. That is, it can be stated that the runtime evaluator 160 evaluates a runtime configuration of the physical plan.

The plan selector 120 can thus search for plans that satisfy the logical goals for which web services are being composed, using existing artificial intelligence (AI) planning techniques. Such planning techniques specifically take goal and state transition specifications, such as service type descriptions, as inputs and synthesize plans to achieve these goals. The output is the abstract workflow plan that identifies the types of services to use, and in what order. However, the abstract workflow plan does not make any commitment as to the exact instances of these services.

The plan assigner 140 therefore instantiates an actual physical plan from the abstract workflow plan, which does commit exact instances of these services. The plan assigner 140 may in one embodiment provide a number of different alternate physical plans, all of which are provided to the runtime evaluator 160. The runtime evaluator 160 then evaluates these physical plans, which is referred to as runtime-evaluating runtime configurations for the physical plans, to determine whether they will satisfy runtime constraints. The runtime evaluator 160 may provide feedback to the plan assigner 140 in this regard, which in turn may provide feedback for the abstract workflow plan to the plan selector 120, as is described in more detail in the previously incorporated-by-reference patent application entitled "Constructing Network-Accessible Services."

The generation of the abstract workflow plan by the plan selector 120 is referred to as computer generation without human intervention, in that once a developer or other individual defines the initial web service to be implemented, the plan selector 120 does not require human intervention to proceed with generation of the abstraction workflow plan, such that it is generated completely by computer. Similarly, the assignment of the physical plan by the plan assigner 140 is referred to as computer assignment without human intervention, because the developer or other individual does not take part in this assignment, and it is completely assigned by computer. The evaluation of the runtime configuration of the physical plan by the runtime evaluator 160 is also a computer evaluation with human intervention, because the developer or other individual does not take part in this evaluation, and it is completely evaluated by computer.

Figure 2:
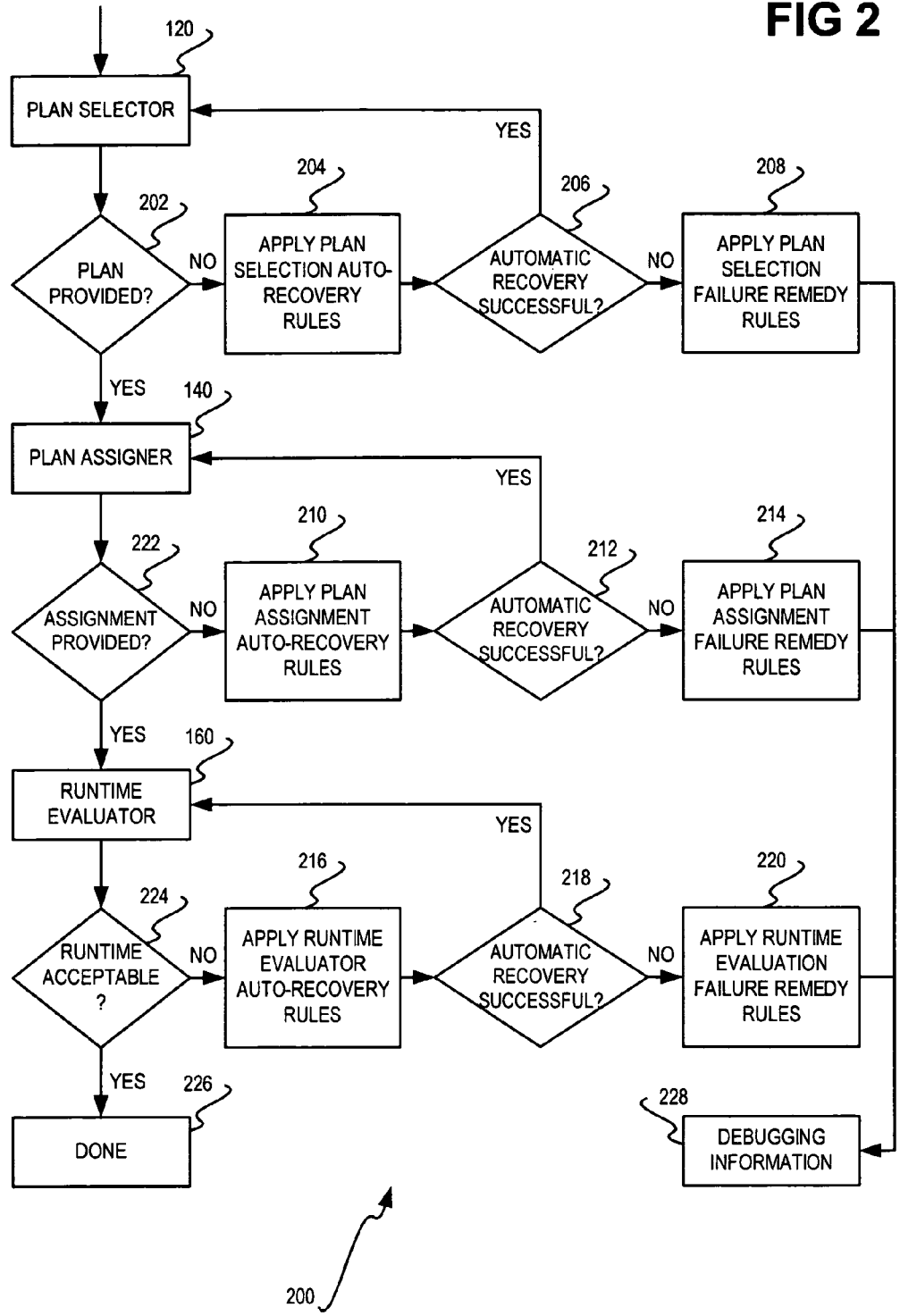
FIG. 2 is a flowchart of a process for recovering from failures in constructing a network-accessible service, and for providing debugging information in response to such failures, according to an embodiment of the invention.

FIG. 2 shows a process 200 that can be followed to provide for recovery and/or debugging information in view of a failure during any part of the network-accessible service generation process performed by the system 100 of FIG. 1, according to an embodiment of the invention. Description of the process 200 is provided herein by first stepping through the various parts of the process 200 in a summary manner. Thereafter, implementation details are provided as to how the process 200 can be actually implemented.

The plan selector 120 attempts to provide an abstract workflow plan for a network-accessible service. If the plan selector 120 is unable to provide the abstract workflow plan (202)—that is, if computer generation of the abstract workflow plan is unsuccessful—then plan selection auto-recovery rules are applied (204) to attempt to automatically recover from this failure. Such auto-recovery may in one embodiment include selection of an alternate abstract workflow plan for the network-accessible service being implemented, or providing other information that can assist in abstract workflow plan generation. Therefore, the process 200 implicitly determines whether computer generation of the abstract workflow plan was successful or not in one embodiment by determining whether the plan selector 120 was successful in generating the abstract workflow plan.

If automatic recovery is successful (206), then the plan selector 120 is provided with the results of the automatic recovery (e.g., an alternate abstract workflow plan), so that the plan selector 120 can again attempt to generate the abstract workflow plan with this new information provided by application of the plan selection auto-recovery rules. The recovery is thus automatic and is performed without human intervention. However, if automatic recovery is unsuccessful (206), then the process 200 applies plan selection failure remedy rules (208), with human intervention. Application of these rules provides debugging information 228, which can assist the developer or other individual in assessing why the failure occurred.

Where the plan selector 120 is ultimately able to provide the abstract workflow plan (202), the plan assigner 140 then attempts to assign a physical plan for the abstract workflow plan. If the plan assigner 140 is unable to assign such a physical plan (222)—that is, if computer assignment of the physical plan is unsuccessful—then plan assignment auto-recovery rules are applied (210) to attempt to automatically recover from this failure. Such auto-recovery may in one embodiment include selection of an alternate physical plan for the abstract workflow plan, or providing other information that can assist in physical plan assignment. Therefore, the process 200 implicitly determines whether computer assignment of the plan assignment was successful or not in one embodiment by determining whether the plan assigner 140 was successful in assigning the physical plan.

If automatic recovery is successful (212), then the plan assigner 140 is provided with the results of the automatic recovery (e.g., an alternate physical plan), so that the plan assigner 140 can again attempt to assign the physical plan for the abstract workflow plan with the new information provided by application of the plan assignment auto-recovery rules. The recovery is thus automatic and is performed without human intervention. However, if automatic recovery is unsuccessful (212), then the process 200 applies plan assignment failure remedy rules (214), with human intervention. Application of these rules provides debugging information 228, which can assist the developer or other individual in assessing why the failure occurred.

Where the plan assigner 140 is ultimately able to assign the physical plan for the abstract workflow plan (222), the runtime evaluator 160 then attempts to evaluate this physical plan, which is referred to herein as attempting to evaluate a runtime configuration of the physical plan. If the runtime evaluator 160 is unable to successfully evaluate the plan (224)—that is, if computer evaluation of the runtime configuration of the plan is unacceptable—then runtime evaluator auto-recovery rules are applied (216) to attempt to automatically recover from this failure. Such auto-recovery may in one embodiment include providing a different or alternate runtime configuration of the physical plan, or providing other information that can assist in runtime evaluation that is acceptable. Therefore, the process 200 implicitly determines whether computer evaluation of the runtime configuration of the physical plan was successful or not in one embodiment by determining whether the runtime evaluation performed by the runtime evaluator 160 was acceptable.

If automatic recovery is successful (218), then the runtime evaluator 160 is provided with the results of the automatic recovery (e.g., a different runtime configuration), so that the runtime evaluator 160 can again attempt to evaluate the runtime configuration of the physical plan with the new information provided by application of the runtime evaluator auto-recovery rules. The recovery is thus automatic and is performed without human intervention. However, if automatic recovery is unsuccessful (218), then the process 200 applies runtime evaluation failure remedy rules (220) with human intervention. Application of these rules provides debugging information 228, which can assist the developer or other individual in assessing why the failure occurred. It is noted that where the runtime evaluation is ultimately acceptable (i.e., successful), then the process 200 is finished (226).

Automatic recovery can be implemented in 204, 210, and 216 of the process 200 of FIG. 2 by interpreting the cause of failure and thus by applying pre-specified rules or rules computer-learned over time. Pre-specified rules can be encoded at setup time. Auto-recovery rules can also be learned by varying resolution for known failure conditions within the scope of existing sets of rules. In addition, some of the remedies suggested to the user may migrate to the auto-recovery set if they provide for auto-recovery, and if the system learns that such recovery is acceptable to the user.

In one embodiment, such automatic recovery rules can be defined as described in the reference Kemafor Anyanwu and Amit Sheth, "P-Queries: Enabling Querying for Semantic Associations on the Semantic Web," Proceedings of the Twelfth International Conference on the World-Wide Web, Budapest, Hungary, previously presented. 690-699 (2003), which is hereby incorporated by reference For example, in relation to automatic recovery of the failure by the plan selector 120 to generate an abstract workflow plan, such failure may occur due to various reasons, such as missing terms, missing relationships, or missing capabilities in the domain model. If the failure is reported as a missing relationship, it may be a false negative resulting from the failure of the plan selector 120 to obtain the desired relationship from the domain model. Automatic recovery from such a false negative is then possible by attempting to discover previously unknown relationships that may exist in the domain model, using the methodology described in the Anyanwu reference. In the Anyanwu reference, a range of relationships that a concept may have with another based on the structure of the relationship graph is described. If there is no direct connectivity/relationship between two concepts, weak relationships are defined between the concepts based on the connectivity of other concepts that connect to these two concepts. The plan selector 120 therefore can be again invoked with the newly discovered relationships.

It is noted that the automatic recovery of 204, 210, and 216 of the process 200 of FIG. 2 does not have to be performed in all embodiments of the invention. For instance, automatic recovery may not be desired by the user, such as the developer or other individual attempting to implement a desired network-accessible service. In such instances, the failure remedy rules are applied in 208, 214, and 220 upon immediate detection of a failure, with human intervention, instead of being applied only after automatic recovery itself has failed, as can be appreciated by those of ordinary skill within the art. An example of such failure remedy rules is now provided, along with a description as to how learning can be used to make the system evolve over time.

The various failure remedy rules can be implemented as a set of decision tables for each phase of the composition process, and thus can be implemented as a rule system. Each rule can be interpreted as an instance of the following rule template: if composition was in <Composition Stage><Information Needed> stage of a rule and <Failure Condition> is true, then return feedback=<Feedback> and remedy=<Resolution>. This rule template thus determines whether a given rule is applicable, and if so, returns some information, specifically feedback and a remedy. For a given failure, then, the following pseudo-code process or algorithm can be performed to determine all of the information that is pertinent to the failure, which is provided to the user as the debugging information 228 in the process 200 of FIG. 2:

```
Result = { }
For each rule in the table
    If the rule matches
        Add the feedback and the remedy of the rule to Result
    End-if
End-for
Return Result
```

From the Result, the automatic rules will be first applied and then the manual ones needing human intervention will be used to guide the developer.

The following table of rules is applicable during the logical composition stage of implementing a network-accessible service. This logical composition stage is performed by the plan selector 120, and therefore the rules in this table are the plan selection failure remedy rules applied in 208 or the plan selection auto-recovery rules in 204 of the process 200 of FIG. 2, where each row represents a rule. If a given rule is applied with human intervention, it is a remedy rule applied in 208, whereas if it is applied without human intervention, it is an auto-recovery rule applied in 204.

| Logical Composition Stage | Information Needed | Failure Condition | Feedback | Resolution | Rule ID |
|---|---|---|---|---|---|
| Concept lookup with ontology | Terms, Relations | Terms not found | Missing Terms | Add terms | L-1 |
| | | Terms not found | Missing Relationship | Add terms, or Add relationships | L-2 |
| | | Relationship not found | Missing Relationship | Add relationship | L-3 |
| Filtering/ selecting services for composition | Capability terms, Selection criteria | Services for capability terms not found | Missing capabilities | New service development | L-4 |
| | | Selection criteria not matched | Missing capabilities, or too constrained criteria | New service development, relax criteria | L-5 |
| Composing abstract flow | Composite capability, Ranking criteria | Composite capability (goal) not achieved | Missing capabilities | New service development | L-6 |
| | | | | Relax or change goals | L-7 |
| | Composite capability, Plan constraints | Composite capability (goal) not achieved | Missing capabilities | New service development | L-8 |
| | | | Plan constraints failed | Relax plan selection constraints | L-9 |
| | Composite capability | No plan for all branches | Missing capabilities | New service development | L-10 |

Thus, the rule template provided above is applied for each of these rows when there is a failure in generating an abstract workflow plan. For instance, if the failure occurred within the concept lookup with ontology phase, where the information needed was various terms and relations among those terms, and the failure condition that was true is that a needed relationship was not found, then the feedback provided is "missing relationship" and the remedy provided is "add relationship." The above table further assigns each rule—i.e., each unique row—with an identifier, or ID.

Next, the following table of rules is applicable during the physical composition stage of implementing a network-accessible service. The physical composition stage is performed by the plan assigner 140, and therefore the rules in this table are the plan assignment failure remedy rules applied in 214 or the plan assignment auto-recovery rules in 210 of the process 200 of FIG. 2, where each row represents a rule. If a given rule is applied with human intervention, it is a remedy rule applied in 214, whereas if it is applied without intervention, it is an auto-recovery ruled applied in 210.

| Physical Composition Stage | Information Needed | Failure Condition | Feedback | Resolution | Rule ID |
|---|---|---|---|---|---|
| Instance selection | Quality of Service (QoS) metrics, Service Level Agreement (SLA) | No instance found | Selection constraints failed | Relax constraints | P-1 |
| | Data type mappings | No mappings known | Mismatch between data type capabilities and requirement | Define data type mappings, deploy another service instance with required data types | P-2 |
| | | | Selection constraints failed | Relax constraints | P-3 |
| | Service specific policies | No instance found | Mismatch between service policies and client characteristics | Deploy new service with appropriate policies, or change client characteristics | P-4 |
| | | | Mismatch between data type capabilities and requirement | Define data type mappings, deploy another service instance with required data types | P-5 |
| | | | Selection constraints failed | Relax constraints | P-6 |
| Deployment | QoS metrics, SLA, WSDL | No instance found | Service(s) not deployed | Deploy the appropriate services | P-7 |
| | Binding information | No instance found | Binding protocol mismatch | Find an alternate service with correct binding. If no alternative exists, deploy the appropriate service. | P-8 |
| | | | Service(s) not deployed | Deploy the appropriate services | P-9 |

Thus, the rule template provided above is applied for each of these rows when there is a failure in assigning a physical plan. For instance, if the failure occurred within the instance selection phase, where the information needed was data type mappings, and the failure condition that was true is that there are no mappings known, then two different rules are relevant. The first rule provides feedback that there may be a mismatch between the data type capabilities and the requirement provided, and provides the remedy that data type mappings should be defined, and that another service instance with the required data types should be deployed. The second type provides feedback that selection constraints may have failed, and provides the remedy that the constraints should be relaxed. The above table assigns each rule—i.e., each unique row—with an identifier, or ID.

Finally, the following table of rules is applicable during the runtime evaluation stage of implementing a network-accessible service. The runtime evaluation stage is performed by the runtime evaluator 160, and therefore the rules in this table are the runtime evaluation failure remedy rules applied in 220 or the runtime evaluator auto-recovery rules in 216 of the process 200 of FIG. 2, where each row represents a rule. If a given rule is applied with human intervention, it is a remedy ruled applied in 220, whereas if it is applied without human intervention, it is an auto-recovery rule applied in 216.

| Execution Composition Stage | Information Needed | Failure Condition | Feedback | Resolution | Rule ID |
|---|---|---|---|---|---|
| Execution | Ports, Binding | Invocation of instance fails | Runtime outage | Pre-reserve or dynamically reschedule | E-1 |
|  | Feedback from runtime evaluator | SLA's such as cost, response time, etc., are violated | Changes in the component service characteristics | Search alternate service instances, or backtrack to a previous composition stage | E-2 |

Thus, the rule template provided above is applied for each of these rows when there is a failure in runtime evaluation of a runtime configuration of a physical plan. For instance, if the failure occurred within the execution phase, where the information needed was ports and binding information, and the failure condition that was true is that the invocation of an instance has failed, then feedback provided is that a runtime outage has occurred, and the remedy provided is that the runtime should be pre-reserved or dynamically rescheduled. The above table assigns each rule—i.e., each unique row— with an identifier, or ID.

Additional rules can be computer-learned over time—that is, learned by the computer performing the process 200 itself. Learning methods can thus be employed over the initial set of rules provided in the three tables above. These learning methods can be useful for prioritizing rules based on user feedback of correctness, as well as generating new rules, within the scope of the existing knowledge base of failure feedback and resolutions. For example, the table fragment that follows is considered.

When a failure occurs due to a term not being found, feedback and a resolution can be suggested based on one of two failure conditions, that of the rule identified as L-1 and that of the rule identified as L-2. Based on whether the provided response (i.e., the provided feedback and resolution) was ultimately correct, as determined by the user, the two rules can then be ranked.

New rules can thus be learned in a number of different ways. For instance, for the same information needed, feedback of existing rules can be randomly selected from, and the appropriateness or correctness of the feedback be determined in light of new conditions based on user feedback. For example, the information needed during composition at the concept look with ontology stage is included under the phrase "terms and relations." Sometimes the feedback and resolution of the rule identified as L-1 can be suggested, even if the failure condition is that a relationship was not found. Based on user feedback, the system can thus learn that terms are not modeled correctly even when the relationships are missing. Therefore, the process is such that new feedback for existing failure situations are built through a combination of machine-learning methods, such as association rules, and user feedback. A rule generator may be implemented that thus inductively suggests new rules and users can judge their relevant, such that if a given rule is helpful, it is included within the ultimate rule set.

Second, because the rules provided in the three tables above follow from the different stages of composition, they have an implicit ordering among between, which can be exploited to learn new remedy rules. For example, for a given failure condition, it is possible to construct a remedial rule that derives from the feedback to a failure condition that occurred in a previous stage of composition. Therefore, a rule generator may be implemented that suggests new rules in this way.

| Logical Composition Stage | Information Needed | Failure Condition | Feedback | Resolution | Rule ID |
|---|---|---|---|---|---|
| Concept lookup with ontology | Terms, Relations | Terms not found | Missing Terms | Add terms | L-1 |
|  |  | Terms not found | Missing Relationship | Add terms, or Add relationships | L-2 |
|  |  | Relationship not found | Missing Relationship | Add relationship | L-3 |

Third, analytical techniques may be employed as to the nature of runtime failures of composed abstract workflow plans and deducing feedback in order to generate more rules. If a given abstract workflow plan is failing at the same point repeatedly, it may be a critical activity within the structure of the abstract workflow plan, and the web service type thereof may need to be replaced, or it may be concluded that such workflow structures are inappropriate within a given execution environment. Therefore, a rule generator may be implemented that suggests new rules in this way.

An example is now provided of the construction of a network-accessible service, and how an embodiment of the invention may be employed to provide debugging information in response to the failure of the construction of this service. FIG. 3 shows a representative and example construction of a network-accessible service 300, according to an embodiment of the invention. Specifically, the logical composition stage of the construction of the service 300 is depicted in FIG. 3, such that what is shown in FIG. 3 is the abstract workflow plan for the network-accessible service 300. FIG. 3 is taken from the previously incorporated-by-reference patent application entitled "Constructing Network-Accessible Services," and further information regarding this example is provided in that patent application.

Here, it is sufficient to state that the network-accessible service 300 uses three types of web services: an Address Book Service 310 that can return the address of a person given his or her name; a Direction Service 320 that can return the driving directions between two input addresses; and, a GPS Direction Service 330 that can return the driving directions between the locations of two people given their names. The ontology domain of the terms of this service 300 may thus be: {address, name, name1, name2, address1, address2, direction}. The relationships may be expressed as: {{name ← → name1, name2}, {address ← → address1, address2}}.

Next, the following table tabulates these services, with available service instances, and thus can be used to represent a physical plan for the abstract workflow plan constructed during a physical composition stage of construction of the network-accessible service 300.

| Service Type | Service Instances |
| --- | --- |
| Address Book Service | $AD_1, AD_2, AD_3, AD_4$ |
| Direction Service | $DD_1, DD_2$ |
| GPS Direction Service | $GPS_1, GPS_2$ |

Now, FIG. 4 schematically represents possible choices of the plan selector 120, as plan P1 400 and plan P2 400', for the network-accessible service 300, according to an embodiment of the invention. As with FIG. 3, FIG. 4 is taken from the previously incorporated-by-reference patent application entitled "Constructing Network-Accessible Services," and further information regarding this example is provided in that patent application. In light of FIG. 4, for plan P1 400, the choices for the plan assigner 140 are L={$GPS_1$, $GPS_2$}, whereas for plan P2 400', the choices for the plan assigner 140 are A1, A2={$AD_1, AD_2, AD_3, AD_4$} and D={$DD_1, DD_2$}, where A1 and A2 are variables representing addresses, and D is a variable representing driving directions.

The runtime variable of cost may have possible values C={25, 50, 100, 200}. That is, the cost, in dollars or other units, is one of 25, 50, 100, and 200. A cost estimate C for each service is presented in the table below.

| | | |
| --- | --- | --- |
| $AD_1$ | ↔ | 25 |
| $AD_2$ | ↔ | 25 |
| $AD_3$ | ↔ | 25 |
| $AD_4$ | ↔ | 50 |
| $GPS_1$ | ↔ | 200 |
| $GPS_2$ | ↔ | 200 |
| $DD_1$ | ↔ | 25 |
| $DD_2$ | ↔ | 50 |

The constraint may be that the cost C should be less than 100 units. The mapping is any service in an instantiated plan that can contribute to cost C. The runtime evaluator 160 thus estimates the cost of each of the service instances and updates service instances and their associated costs as needed.

Now, the composition goal for the network-accessible service 300 in question may be to generate driving directions to navigate between the respective addresses of persons whose names are provided as input and the cost of the composite service should be less than 100 units. This example is the same example described in the previously incorporated-by-reference patent application entitled "Constructing Network-Accessible Services." In the first iteration, the plan selector 120 may output plan P1. The plan assigner 140 may then output L=$GPS_1$, where there is a mapping L→C and the variable L contributes to C. The runtime evaluator 160 outputs the analysis that C is greater than 100, which is unacceptable since C should be less than 100, such that the runtime evaluator 160 provides this feedback that C should be less than 100. The plan assigner 140 may therefore provide feedback that L has no feasible lower assignment, such that L should be set equal to nil.

In the second iteration, the plan selector 120 may thus output plan P2. The plan assigner 140 may then output A1=$AD_1$, A2=$AD_4$, and D=$DD_1$, where there is a mapping A1, A2, D→C and variables A1, A2, and D contribute to C. The runtime evaluator 160 outputs the analysis that C is equal to 100, which is unacceptable since C should be less than 100, such that the runtime evaluator provides this feedback that C should be less than 100. The plan assigner 140 may therefore provide feedback that A1 has no lower assignment, A2 has no lower assignment, and D has no lower assignment, such that no change in A1 or D is possible, although A2 has feasible alternatives.

In the third iteration, the plan selector 120 may therefore again output plan P2. The plan assignment 140 may then output A1=$AD_1$, A2=$AD_2$, and D=$DD_1$, where there is a mapping A1, A2, D→C and variables A1, A2, and D contribute to C. The runtime evaluator outputs the analysis that C is equal to 75, which is acceptable. Therefore, in the third iteration, a successful implementation of the network-accessible service 300 has been generated.

In light of the example network-accessible service 300 described in relation to FIGS. 3 and 4, an embodiment of the invention may provide failure feedback and remedies (i.e., debugging information) as follows. For instance, the composition specification may be to obtain a service that provides the "city" for a person whose "name" is provided as input. However, the term city is not present in the ontology domain of terms, such that the composition should fail at the logical composition stage. The output would thus be that composition has failed, such that, via rule L-1, the feedback is "missing terms," which can be resolved by adding "city" to the ontology domain of terms.

Now, it is supposed that the term "city" has been added to the ontology domain. However, there is no relation to "address." Therefore, the composition should fail at the logical composition stage again. The output would thus be that composition has failed, such that, via rule L-3, the feedback is "missing relationship," which can be resolved by adding the relationship "part of" between "city" and "address" to the ontology domain of terms. Furthermore, via rule L-4, the output may also state that the services for "city" are not found, such that new services have to be created and populated. The system may show the application of both rules L-3 and L-4 to the user.

However, the user may have accepted the feedback as to the rule L-3, but not the feedback as to the rule L-4. The system may thus record that there is one positive example for L-3 while there is one negative example for L-4. For a similar failure in the future, the system can use this information to rank one rule over the other, to determine which rule to apply and show to the user.

Next, the composition specification may be to obtain services that give the "driving directions" to navigate between the respective addresses of persons whose "names" are provided as input. It is supposed that the plan P2 as has been described above is provided. The plan includes two Address Book Services and one Driving Direction Services, such that instances for them have to be found. Suppose the plan assigner 140 selects $AD_1$ and $AD_2$ for the two Address Book Services. Thus, the composition has progressed to the deployment stage of the physical composition stage.

Now, it is presumed that there is a failure condition of "no instance found." However, instead of the rule P-7, a new rule could alternatively be generated under the current failure condition having the feedback of the rule P-3. If the user accepts the feedback provide, a new validated rule may thus be added to the system.

Figure 5:
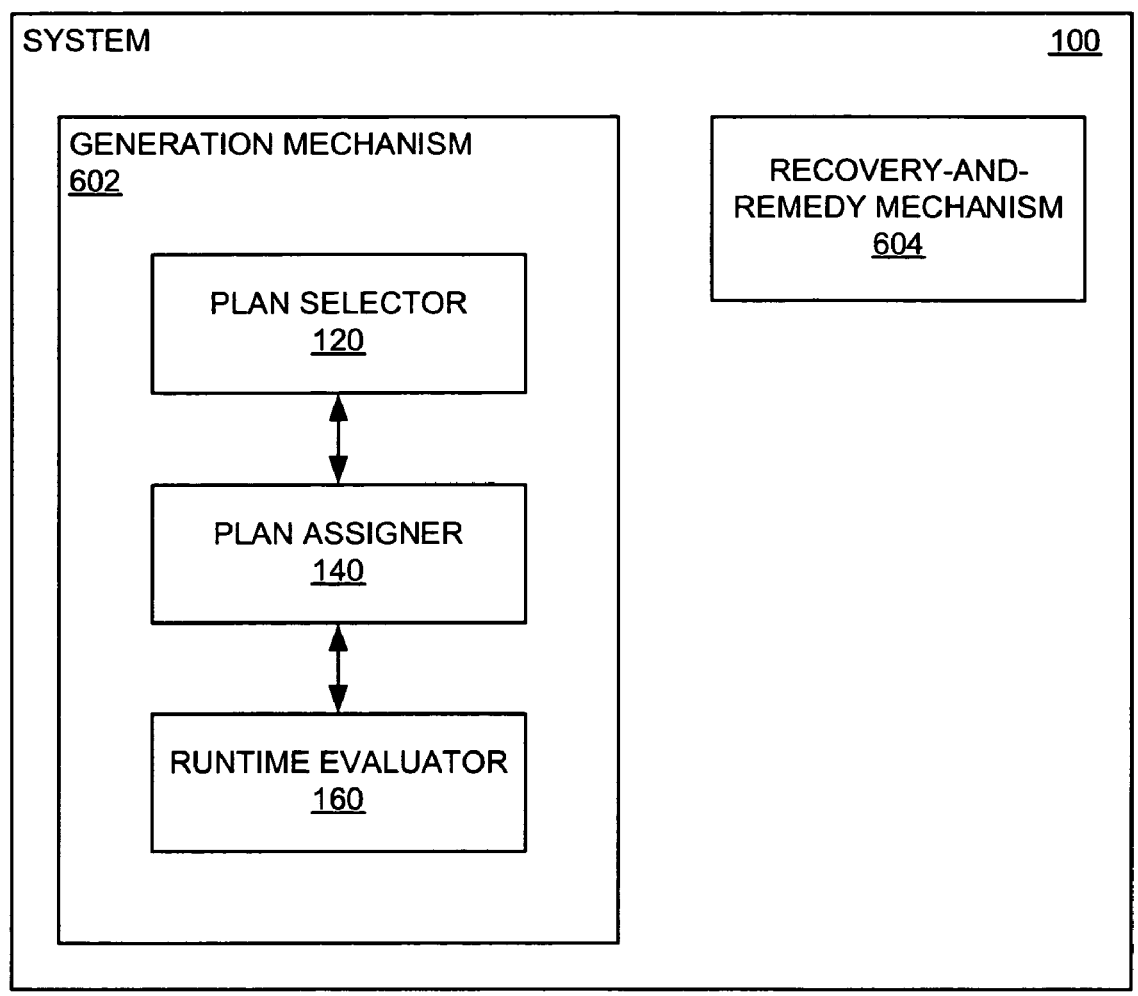
FIG. 5 is a diagram of a representative system, according to an embodiment of the invention.

FIG. 5 shows the representative system 100 in more detail, according to an embodiment of the invention, which can further be used to implement the recovery and remedy aspects of network-accessible service construction that have been described. Thus, the system 100 includes a network-accessible-service generation mechanism 602 and a failure recovery-and-remedy mechanism 604. Each of the mechanisms 602 and 604 may be implemented in hardware, software, or a combination of hardware and software.

The generation mechanism 602 generates the abstract workflow plan for a network-accessible service, assigns a physical plan for the abstract workflow plan, and evaluates a runtime configuration of the physical plan, as has been described, without human intervention. The mechanism 602 thus includes the plan selector 120, the plan assigner 140, and the runtime evaluator 160. The recovery-and-remedy mechanism 604, by comparison, can attempt to automatically recover from failures within the construction process, without human intervention, and/or can apply rules upon such failures to provide debugging information, with human intervention, as has been described.

Finally, FIG. 6 is a schematic representation of a computing device 500 of a type suitable for constructing network-accessible services as has been described, according to an embodiment of the invention. Computer software executes under a suitable operating system installed on the computing device 500 to assist in performing the described techniques. This computer software is programmed using any suitable computer programming language.

The components of the computing device 500 include a computer 520, a keyboard 510 and a mouse 515, and a video display 590. The computer 520 includes a processor 540, a memory 550, input/output (I/O) interfaces 560, 565, a video interface 545, and a storage device 555. The processor 540 is a central processing unit (CPU) that executes the operating system and the computer software executing under the operating system. The memory 550 includes random access memory (RAM) and read-only memory (ROM), and is used under direction of the processor 540.

The video interface 545 is connected to the video display 590 and provides video signals for display on the video display 590. User input to operate the computer 520 is provided from the keyboard 510 and mouse 515. The storage device 555 can include a disk drive or any other suitable storage medium. Each of the components of the computer 520 is connected to an internal bus 530 that includes data, address, and control buses, to allow components of the computer 520 to communicate with each other via the bus 530. The computing device 500 can be connected to one or more other similar computers via an input/output (I/O) interface 565 using a communication channel 585 to a network, represented as the Internet 580.

The computer software may be recorded on a portable storage medium, in which case, the computer software program is accessed by the computing device 500 from the storage device 555. Alternatively, the computer software can be accessed directly from the Internet 580 by the computer 520. In either case, a user can interact with the computing device 500 using the keyboard 510 and mouse 515 to operate the programmed computer software executing on the computer 520. Other configurations or types of computer systems can be equally well used to perform computational aspects of composing network services. The computing device 500 described above is described only as an example of a particular type of system suitable for implementing the described techniques.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

What is claimed is:

1. A method comprising:
   in response to determining that computer generation of an abstract workflow plan for a network-accessible service resulted in a failure, attempting to automatically recover from the failure without human intervention in a process that includes one of selecting an alternate abstract workflow plan for the network-accessible service being implemented, and providing other information to assist in abstract workflow plan generation;
   where attempting to automatically recover from the failure of the computer generation of the abstract workflow plan is unsuccessful, applying a plurality of plan selection failure remedy rules, with human intervention, to assist in debugging the failure of the computer generation of the abstract workflow plan;
   in response to determining that computer assignment of a physical plan for the abstract workflow plan resulted in a failure, attempting to automatically recover from the failure without human intervention in a process that includes one of selection of an alternate physical plan for the abstract workflow plan, and providing other information that can assist in physical plan assignment;
   where attempting to automatically recover from the failure of the computer assignment of the physical plan for the abstract workflow plan is unsuccessful, applying a plurality of plan assignment failure remedy rules, with human intervention, to assist in debugging the failure of the computer assignment of the physical plan;

in response to determining that computer evaluation of a runtime configuration for the physical plan resulted in a failure, attempting to automatically recover from the failure without human intervention in a process that includes one of providing a different or alternate runtime configuration of the physical plan, and providing other information that can assist in runtime evaluation; and, where attempting to automatically recover from the failure of the computer evaluation of the runtime configuration for the physical plan is unsuccessful, applying a plurality of runtime evaluation failure remedy rules, with human intervention, to assist in debugging the failure of the computer evaluation of the runtime configuration.

2. The method of claim 1, wherein attempting to automatically recover from the failure of the computer generation of the abstract workflow plan for the network-accessible service comprises applying a plurality of rules.

3. The method of claim 2, wherein the plurality of rules comprise pre-specified rules.

4. The method of claim 2, wherein the plurality of rules comprise computer-learned rules over time.

5. The method of claim 1, wherein applying the plurality of plan selection failure remedy rules, with human intervention, to assist in debugging the failure of the computer generation of the abstract workflow plan comprises applying rules pertaining to a concept lookup with ontology stage of the computer generation of the abstract workflow plan.

6. The method of claim 1, wherein applying the plurality of plan selection failure remedy rules, with human intervention, to assist in debugging the failure of the computer generation of the abstract workflow plan comprises applying rules pertaining to a filtering and selecting services for composition stage of the computer generation of the abstract workflow plan.

7. The method of claim 1, wherein applying the plurality of plan selection failure remedy rules, with human intervention, to assist in debugging the failure of the computer generation of the abstract workflow plan comprises applying rules pertaining to a composing the abstract workflow plan stage of the computer generation of the abstract workflow plan.

8. The method of claim 1, wherein attempting to automatically recover from the failure of the computer assignment of the physical plan for the abstract workflow plan comprises applying a plurality of rules.

9. The method of claim 8, wherein the plurality of rules comprise pre-specified rules.

10. The method of claim 8, wherein the plurality of rules comprise computer-learned rules over time.

11. The method of claim 1, wherein applying the plurality of plan assignment failure remedy rules, with human intervention, to assist in debugging the failure of the computer assignment of the physical plan comprises applying rules pertaining to an instance selection stage of the computer assignment of the physical plan.

12. The method of claim 1, wherein applying the plurality of plan assignment failure remedy rules, with human intervention, to assist in debugging the failure of the computer assignment of the physical plan comprises applying rules pertaining to a deployment stage of the computer assignment of the physical plan.

13. The method of claim 1, wherein attempting to automatically recover from the failure of the computer evaluation of the runtime configuration for the physical plan comprises applying a plurality of rules.

14. The method of claim 13, wherein the plurality of rules comprise pre-specified rules.

15. The method of claim 13, wherein the plurality of rules comprise computer-learned rules over time.

16. The method of claim 1, wherein applying the plurality of runtime evaluation failure remedy rules, with human intervention, to assist in debugging the failure of the computer evaluation of the runtime configuration comprises applying rules pertaining to an evaluation stage of the computer evaluation of the runtime configuration.

17. A programmable storage medium for storing a program of machine-readable instructions executable by a digital processing apparatus to perform operations supporting a method of generating an abstract workflow plan, the operations comprising:

generating an abstract workflow plan for a network-accessible server on a network-accessible-service generation mechanism to assign a physical plan for the abstract workflow plan, evaluating a runtime configuration for the physical plan, without human intervention, and attempting to automatically recover from a failure of said abstract workflow plan without human intervention by selecting an alternate abstract workflow plan for the network-accessible service being implemented; and applying a plurality of rules to assist in debugging a failure recovery-and-remedy mechanism to attempt to, upon failures in generating the abstract workflow plan, assign the physical plan, and evaluate the runtime configuration for the physical plan, with human intervention.

18. The programmable storage medium tangibly embodying a program of machine-readable instructions of claim 17, wherein the applying a plurality of rules to assist in debugging in the failure recovery-and-remedy mechanism further comprises, without human intervention, attempting to automatically recover from the failures by generating the abstract workflow plan, assigning the physical plan, and evaluating the runtime configuration for the physical plan, before applying the plurality of rules to assist in debugging.

19. A programmable storage medium for storing a program of machine-readable instructions executable by a digital processing apparatus to perform operations supporting a method of generating an abstract workflow plan, the operations comprising:

computer-executable code performing a method comprising, without human intervention, attempting to automatically recover from a failure in generating an abstract workflow plan for a network-accessible service, from a failure in assigning a physical plan for the abstract workflow plan, and from a failure in evaluating a runtime configuration for the physical plan, by selecting an alternate abstract workflow plan for the network-accessible service being implemented; and with human intervention, applying a plurality of rules upon failure to automatically recover to assist in debugging.

20. The programmable storage medium tangibly embodying a program of machine-readable instructions of claim 19, wherein the method further comprises applying the plurality of rules by applying plan selection failure remedy rules where attempting to automatically recover from failure of generation of the abstract workflow plan is unsuccessful, said operations further comprising applying plan assignment failure remedy rules where attempting to automatically recover from failure of assignment of the physical plan, and applying runtime evaluation failure remedy rules where attempting to automatically recover from failure of evaluation of the runtime configuration.

* * * * *